(12) United States Patent
Racape et al.

(10) Patent No.: US 12,238,277 B2
(45) Date of Patent: *Feb. 25, 2025

(54) METHOD AND APPARATUS FOR CANDIDATE LIST PRUNING

(71) Applicant: INTERDIGITAL VC HOLDINGS, INC., Wilmington, DE (US)

(72) Inventors: Fabien Racape, San Francisco, CA (US); Franck Galpin, Thorigne-Fouillard (FR); Antoine Robert, Mezieres sur Couesnon (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/074,769

(22) Filed: Dec. 5, 2022

(65) Prior Publication Data

US 2023/0131933 A1    Apr. 27, 2023

Related U.S. Application Data

(63) Continuation of application No. 17/373,927, filed on Jul. 13, 2021, now Pat. No. 11,553,175, which is a (Continued)

(30) Foreign Application Priority Data

May 31, 2017    (EP) .................................... 17305630

(51) Int. Cl.
*H04N 11/02*    (2006.01)
*H04N 19/105*   (2014.01)
(Continued)

(52) U.S. Cl.
CPC ......... *H04N 19/105* (2014.11); *H04N 19/176* (2014.11); *H04N 19/46* (2014.11); *H04N 19/52* (2014.11)

(58) Field of Classification Search
CPC .................................................... H04N 19/105
(Continued)

(56) References Cited

U.S. PATENT DOCUMENTS 9,325,990 B2 * 4/2016 Chen .................... H04N 19/147
10,491,918 B2 * 11/2019 Park ....................... H04N 19/52
(Continued)

FOREIGN PATENT DOCUMENTS

CN    103339938    10/2013
CN    103999468     8/2014
(Continued)

OTHER PUBLICATIONS

Laroche et al., Robust Solution for the AMVP Parsing Issue, 96. MPEG Meeting: Mar. 21, 2011-Mar. 25, 2011; Geneva; Motion Picture Expert Group or ISO/IEC JTC1/SC29/WG11, JCTVC-E219, No. m19740, Mar. 18, 2011,—*—cited in parent application.
(Continued)

*Primary Examiner* — Leron Beck
(74) *Attorney, Agent, or Firm* — Ronald Kolczynski

(57) ABSTRACT

Video signal coding and decoding functions can generate lists of potential candidates to use in coding and decoding, for example, predictors. Video signal coding component candidate undergo operations before potential inclusion in candidate lists. The candidates are checked after being modified by the operations to see if other equal candidates are already in the candidate list. If equal candidates are not in the list, the modified candidates are added to the candidate list. If equal candidates are already in the list, the modified candidates are not added to the list. Operations that can be performed comprise rounding and clipping.

19 Claims, 12 Drawing Sheets

Related U.S. Application Data continuation of application No. 16/617,170, filed as application No. PCT/EP2018/064180 on May 30, 2018, now Pat. No. 11,089,298.

(51) Int. Cl.
*H04N 19/176* (2014.01)
*H04N 19/46* (2014.01)
*H04N 19/52* (2014.01)

(58) Field of Classification Search
USPC ........................ 375/240.01–240.29
See application file for complete search history.

(56) References Cited

U.S. PATENT DOCUMENTS

| | | | | |
|---|---|---|---|---|
| 2006/0098733 A1* | 5/2006 | Matsumura | ......... | H04N 19/172 |
| | | | | 375/E7.14 |
| 2009/0097560 A1* | 4/2009 | Robertson | ............ | H04N 19/172 |
| | | | | 375/E7.146 |
| 2011/0194609 A1 | 8/2011 | Rusert et al. | | |
| 2013/0022119 A1* | 1/2013 | Chien | ................... | H04N 19/51 |
| | | | | 375/E7.123 |
| 2013/0163668 A1* | 6/2013 | Chen | ................... | H04N 19/463 |
| | | | | 375/240.14 |
| 2013/0272410 A1* | 10/2013 | Seregin | ................. | H04N 19/52 |
| | | | | 375/240.16 |
| 2013/0287116 A1* | 10/2013 | Helle | ................... | H04N 19/196 |
| | | | | 375/240.24 |
| 2013/0329007 A1 | 12/2013 | Zhang et al. | | |
| 2013/0336406 A1 | 12/2013 | Zhang et al. | | |
| 2014/0184740 A1* | 7/2014 | Zhang | ................. | H04N 19/503 |
| | | | | 348/43 |
| 2014/0253681 A1* | 9/2014 | Zhang | ................. | H04N 19/105 |
| | | | | 348/43 |
| 2014/0269916 A1* | 9/2014 | Lim | ....................... | H04N 19/52 |
| | | | | 375/240.15 |
| 2015/0023422 A1* | 1/2015 | Zhang | ................... | H04N 19/14 |
| | | | | 375/240.16 |
| 2015/0181229 A1 | 6/2015 | Lin et al. | | |
| 2015/0229930 A1 | 8/2015 | Sugio et al. | | |
| 2015/0381986 A1* | 12/2015 | Chen | ................... | H04N 19/176 |
| | | | | 348/43 |
| 2017/0094305 A1* | 3/2017 | Li | ....................... | H04N 19/136 |
| 2017/0127041 A1 | 5/2017 | Bang et al. | | |

FOREIGN PATENT DOCUMENTS

| | | |
|---|---|---|
| CN | 104581181 | 4/2015 |
| CN | 104718760 | 6/2015 |
| EP | 2960855 | 12/2015 |
| GB | 2539212 | 12/2016 |
| JP | H1023427 | 1/1998 |
| JP | 2013098899 | 5/2013 |
| JP | 2013102280 | 5/2013 |
| JP | 2014535249 | 12/2014 |
| KR | 20130028315 | 3/2013 |
| WO | 2013057877 | 4/2013 |

OTHER PUBLICATIONS

Rosewarne et al., High efficiency video coding (HEVC) Test Model 16 (HM 16) Improved Encoder Description Update 7, 25. JCT-VC Meeting; Oct. 14, 2016-Oct. 21, 2016; Chengdu; Joint Collaborative Team on Video Coding ISO/IEC JTC1/SC29/WG11 and ITU-T SG.16); URL: http://wftp.itu.int./av-arch/jctvc-site/, No. JCTVC-Y1002, Jan. 6, 2017,—*—cited in parent application.

Jeon et al., On MVP List Pruning Process, 97. MPEG Meeting; Jul. 18, 2011-Jul. 22, 2011; Torino; (Motion Picture Expert Group or ISO/IEC JTC1/SC29/WG11), No. m20519, Jul. 1, 2011,—*—cited in parent application.

Jing et al., Research and Improvement of Merge Mode Candidate Decision for High Efficiency Video Coding, Computer Engineering, vol. 41, No. 12, pp. 256-259, 264, Dec. 15, 2015,—*—cited in parent application.

Chen, et al., Algorithm Description of Joint Exploration Test Model 5, 5. JVET Meeting; Dec. 1, 2017-Jan. 20, 2017; Geneva; (The Joint Video Exploration Team of ISO/IEC JTC 1/SC29/WG11 and ITU-T SG.16); URL: http://phenix.int-evry.fr/jvet/, No. JVET-E1001-v2, Feb. 11, 2017,—*—cited in parent application.

Liu, et al., Local Illumination Compensation, Qualcomm Incorporated, Video Coding Experts Group (VCEG), Telecommunications Standardization Sector ITU-T SG16/Q6, Doc. VCEG-AZ06, 52nd Meeting: Jun. 19-26, 2015, Warsaw, Poland, 7 pages—*—cited in parent application.

Robert et al., High Precision FRUC With Additional Candidates, Joint Video Exploration Team (JVET) of ITU-T SG 16 WP 3 and ISO/IEC JTC 1/SC 29/WG 11, 4th Meeting: Chengdu, CN, Oct. 15-21, 2016, Document: JVET-D0046, pp. 1-7—*—cited in parent application.

* cited by examiner

METHOD AND APPARATUS FOR CANDIDATE LIST PRUNING

FIELD OF THE INVENTION

The present principles relate to the field of video compression.

BACKGROUND OF THE INVENTION

Video coding organizations strive to develop more efficient coding standards and tools. Some of these standards are High Efficiency Video Coding ISO/IEC ITU-T H.265 (HEVC), MPEG-4 Part 10, Advanced Video Coding (MPEG-4 AVC) and Joint Exploration Test Model (JEM) or H.266. Many coding tools construct lists of possible candidates for such things as motion vector prediction and intra prediction. The aim is to find the best candidate in the RDO (Rate Distortion Optimization) sense.

By ensuring the uniqueness of the candidates within these lists, it is possible to improve the performances of tools with limited size lists, by adding diversity within these lists, and/or reduce the complexity of tools with unlimited lists, for example, by removing identical candidates within these lists.

Under the aspects described herein, several embodiments for candidate list pruning are described.

SUMMARY OF THE INVENTION

These and other drawbacks and disadvantages of the prior art are addressed by the present aspects, which are directed to a method and apparatus for candidate list pruning to increase the coding efficiency and/or to reduce the complexity of video codecs by ensuring uniqueness of the different candidates used.

Most of the tools of those video codecs construct lists of candidates before selecting the best one. In order to improve their performances and/or to reduce their complexity, the candidates of these lists should be unique to ensure a full diversity with the minimal number of candidates.

The candidate pruning could be generic, such that it is applied to all tools systematically, or it could also be specific to each set of tools.

According to another aspect of the described embodiments, there is provided a method for encoding or decoding a video signal using candidate list pruning. The method comprises performing at least one operation on a coding component candidate of a video signal to generate at least one modified candidate. The method further comprises determining whether the at least one modified candidate is already present in a candidate list, and adding the at least one modified candidate if the at least one modified candidate is not previously present in the candidate list.

According to another aspect of the described embodiments, there is provided an apparatus for encoding or decoding a video signal using candidate list pruning. The apparatus comprises a memory, and a processor configured to encode or decode a video signal using the candidate list by performing at least one operation on a on a coding component candidate of a video signal to generate at least one modified candidate, by determining whether the at least one modified candidate is already present in a candidate list, and by adding the at least one modified candidate if the at least one modified candidate is not previously present in the candidate list.

According to another aspect of the described embodiments, there is provided a non-transitory computer readable medium containing data content generated according to any of the encoding method embodiments, or by any of the encoder apparatus embodiments, for playback using a processor.

According to another aspect of the described embodiments, there is provided a signal comprising video data generated according to any of the encoding method embodiments, or by any of the encoder apparatus embodiments, for playback using a processor.

According to another aspect of the described embodiments, there is provided a computer program product comprising instructions which, when the program is executed by a computer, cause the computer to carry out the method of any one of the decoding method or decoding apparatus embodiments.

These and other aspects, features and advantages of the present principles will become apparent from the following detailed description of exemplary embodiments, which is to be read in connection with the accompanying drawings.

DETAILED DESCRIPTION

An approach for candidate list pruning for video encoding and decoding is described herein.

Most of the tools of video codecs construct lists of candidates before selecting the best one to use in the coding or decoding process. These candidates are video coding component candidates used in the coding or decoding of a video signal. The video components can be elements such as motion vectors, predictions, quantization parameters, for example. In order to improve their performances and/or to reduce their complexity, the candidates of these lists should be unique to ensure a full diversity with the minimal number of candidates. The candidate pruning can be generic in that it can be applied to all tools systematically, or it can also be specific to each set of tools. Some of such tools using lists are presented hereafter, but the general aspects described herein are not limited to these tools.

1. AMVP Prediction

The AMVP (Advanced Motion Vector Prediction) prediction consists in constructing a list of two predictors for each reference frame of each reference frame list (L0 and L1). These two AMVP predictors are composed of a motion vector.

For a particular reference frame of a particular reference frame list, the predictors come from spatial and/or temporal neighboring blocks (Coding Units/Prediction Units). Further operations can then be performed on these predictors, such as FRUC (Frame Rate Up Conversion) derivation (i.e. motion vector refinement), clipping and/or rounding operations, etc. The process for such predictor derivation is as in FIG. 1.

2. Merge Prediction

The Merge prediction consists in constructing a set of seven motion vector predictors with their associated reference frame and reference frame list, and corresponding IC flag (i.e. the local Illumination Compensation flag).

These seven Merge predictors are composed of:
A motion vector
A reference frame index
A reference frame list
An IC flag The predictors come from spatial and/or temporal neighbors from which the motion vector and associated reference frame and IC flag are picked. Further operations can then be performed on these predictors, such as clipping and/or rounding operations, for example.

Figure 2:
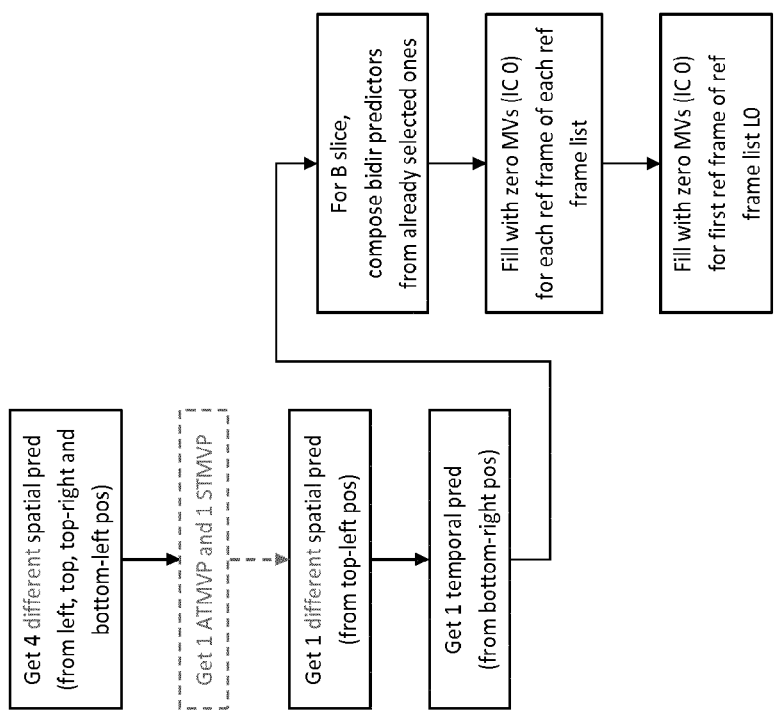
FIG. 2 shows a merge derivation process of seven predictors and their associated reference frame in a reference frame list, and IC flag.

The process for such predictor derivation is as shown in FIG. 2, it stops as soon as seven candidates have been obtained.

3. FRUC Prediction

The FRUC (Frame Rate Up Conversion) process uses the Merge predictors as described in the previous section, but do not use the IC flag information of those predictors. The FRUC Merge predictors coming from the Merge candidates are composed of:
A motion vector
A reference frame index
A reference frame list The predictors come from spatial and/or temporal neighbors from which the motion vector and associated reference frame are selected. Further operations can then be performed on these predictors, such as clipping and/or rounding operations, for example.
The process for such predictor derivation is as shown in FIG. 2.

4. Affine AMVP Prediction

The Affine AMVP prediction is quite similar to the one of classical AMVP, but Affine motion estimation and compensation are performed by using two motion vectors, called subsequently affine pair of motion vectors. Then, it consists in finding two affine pairs of motion vector predictors for each reference frame of each reference frame list (L0 and L1).

The Affine AMVP predictors are composed of:
A pair of motion vectors

Figure 3:
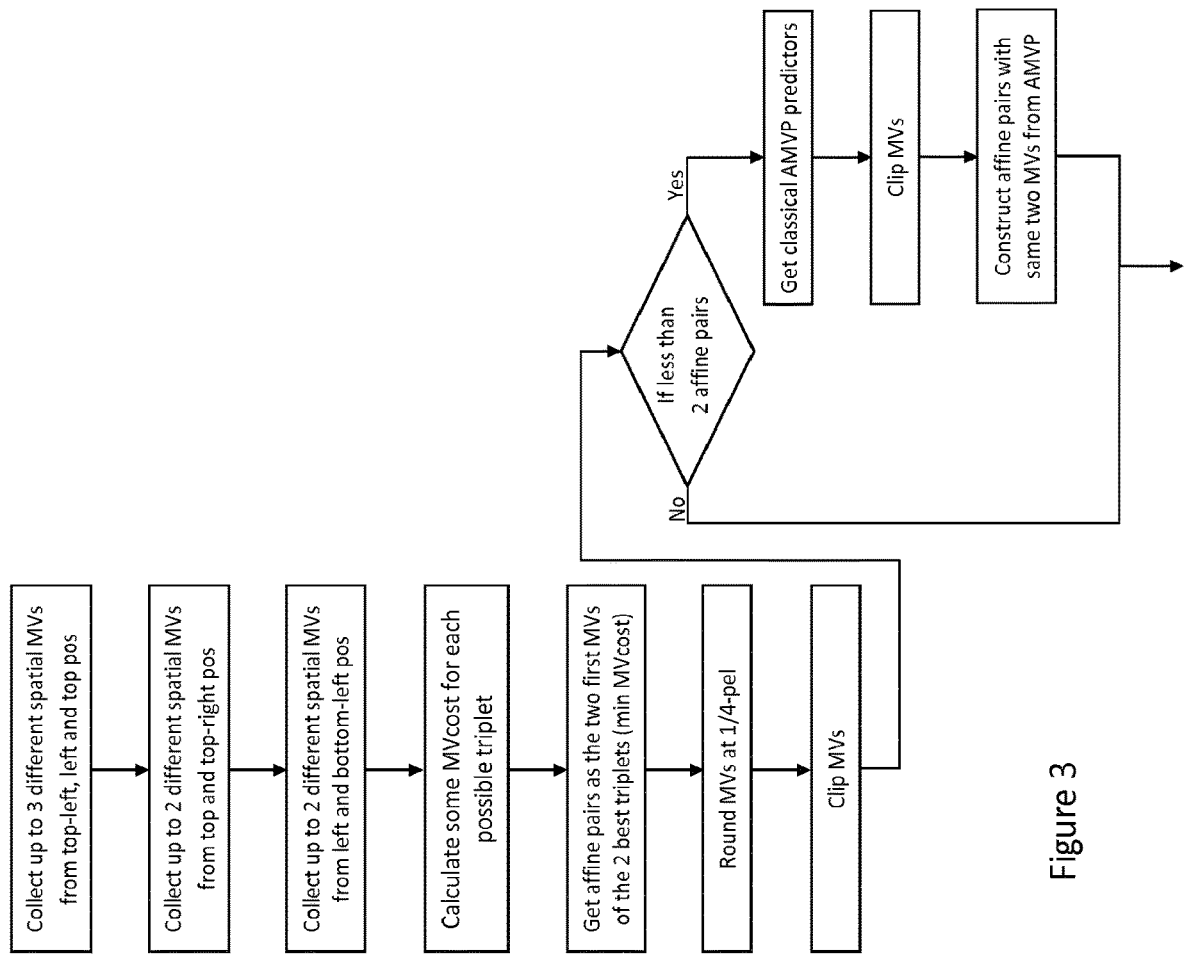
FIG. 3 shows an affine AMVP derivation process of two affine pairs of motion vector predictors for a particular reference frame of a particular reference frame list.

For a particular reference frame of a particular reference frame list, the predictors come from spatial and/or temporal neighboring blocks. Further operations can then be performed on these predictors, such as clipping and/or rounding operations, etc. The process for such predictor derivation is as shown in FIG. 3.

5. Intra Prediction

The Intra prediction consists in testing several directional predictions (9 in AVC, up to 35 in HEVC and up to 67 in JEM) in order to find the best one. In the more recent codecs, several new tools have been added around Intra prediction as MPM (Most Probable Mode), RSAF (Reference Sample Adaptive Filter), PDPC (Position Dependent intra Prediction Combination), for example.

In any case, several or all predictions are tested, thus reducing this number of predictions can decrease the complexity.

The main aspects of the described embodiments is:
During the construction of any list of candidates, each time a new candidate is to be added into that list:
Perform all operations that can modify this candidate
Compare this new candidate to all the already selected ones in the list
Add it to the list if it is not already present
This is done either to diversify the list by ensuring the uniqueness of each candidate or to reduce the list size, and so the complexity to deal with it.

The following embodiments explain how to apply this to each coding mode—1: AMVP, 2: Merge, 3: FRUC, 4: Affine, 5: Intra.

In a first embodiment, the diversity of the AMVP generated list of predictors can be improved in several ways.

In a first sub-embodiment of the first embodiment, the AMVP scheme, operations that can modify the candidates should be applied just before adding them into the list of predictors.

Figure 1:
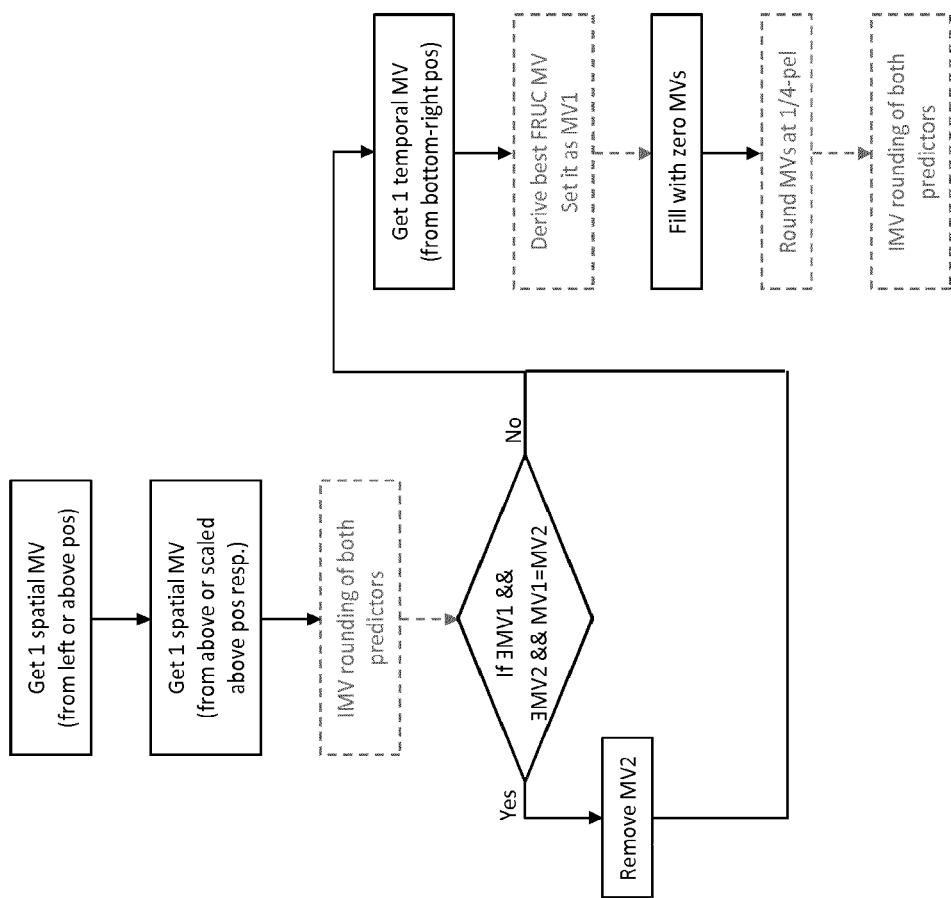
FIG. 1 shows an AMVP derivation process of two motion vector predictors.

In the scheme of FIG. 1, these operations stand for the rounding operations (¼-pel and Integer Motion Vector), but can also be extended to future ones (clipping, another rounding, etc). These operations should be performed together on candidates after they have been collected and before being added into the list if not already present as shown in FIG. 4.

The "compare/add" function consists in comparing the retrieved candidate to the already selected ones. As an AMVP predictor is composed of only a motion vector, this function compares motion vectors.

Figure 4:
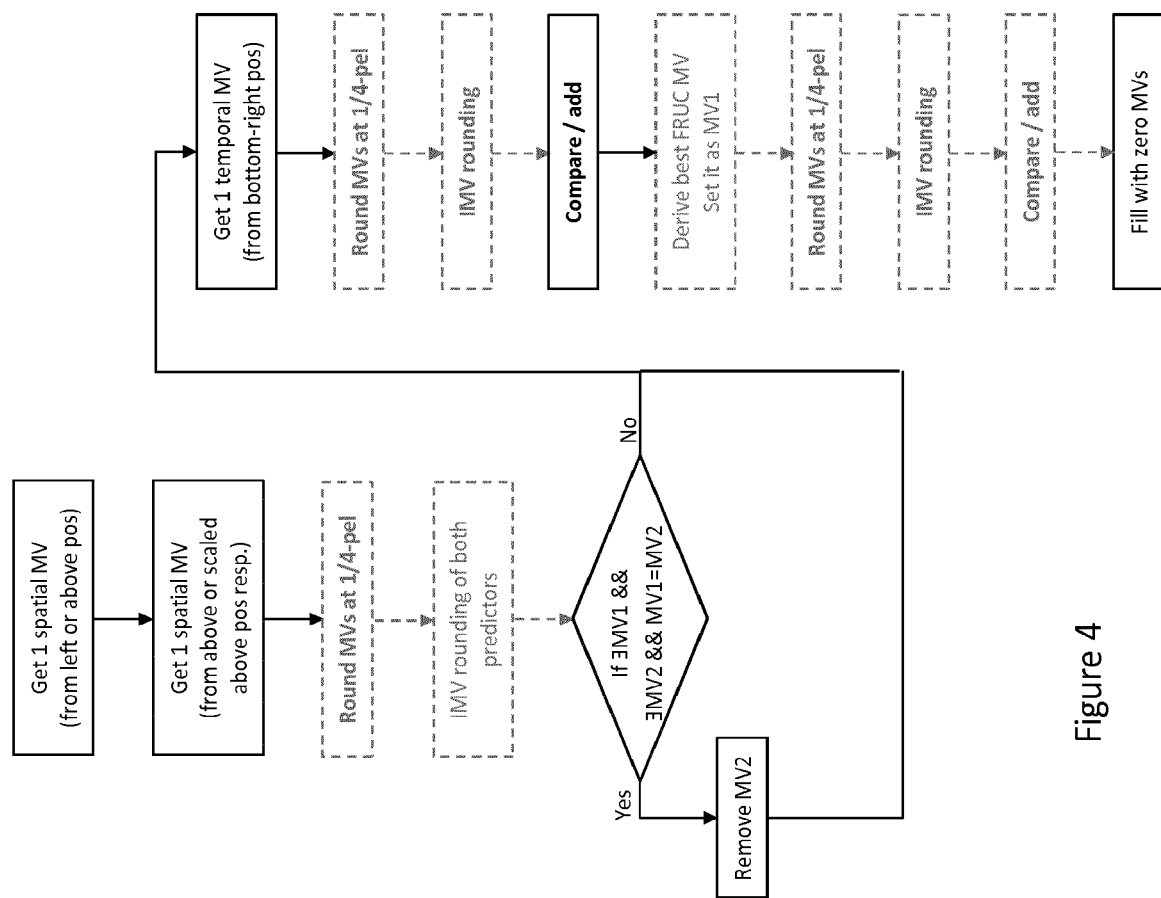
FIG. 4 shows an AMVP derivation process of two unique motion vector predictors for a particular reference frame of a particular reference frame list.

In a second sub-embodiment of the first embodiment, the AMVP scheme of FIG. 1 and FIG. 4, the second spatial candidate does not use the information about the first selected one (if some).

It is then possible to inform the second spatial motion vector search with the first selected motion vector predictor. The first steps of the scheme then become as shown on FIG. 5.

Since the operation to get a spatial candidate can find one in several ways and stops as soon as one is found, the "different" function stands for a comparison of the potential candidates to the already selected one to ensure a different predictor selection.

Figure 6:
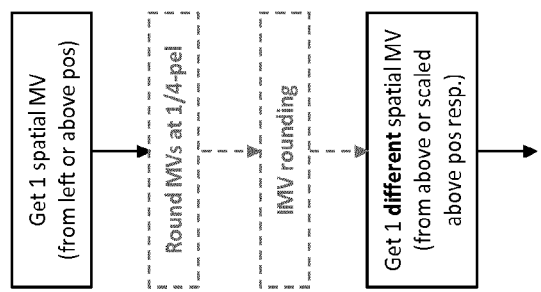
FIG. 6 shows two first steps of an AMVP derivation process of two unique motion vector predictors for a particular reference frame of a particular reference frame list.

If the first two sub-embodiments are coupled, it is then also possible to perform the operations that modify the motion vector predictors (rounding) as soon as a candidate is reached so as to maximize the number of different candidates as shown in FIG. 6 and in FIG. 4.

In a second embodiment, the diversity of the Merge generated list of predictors can be improved by comparing each new candidate to previously selected ones before adding it in the list only if it is not already present.

Figure 7:
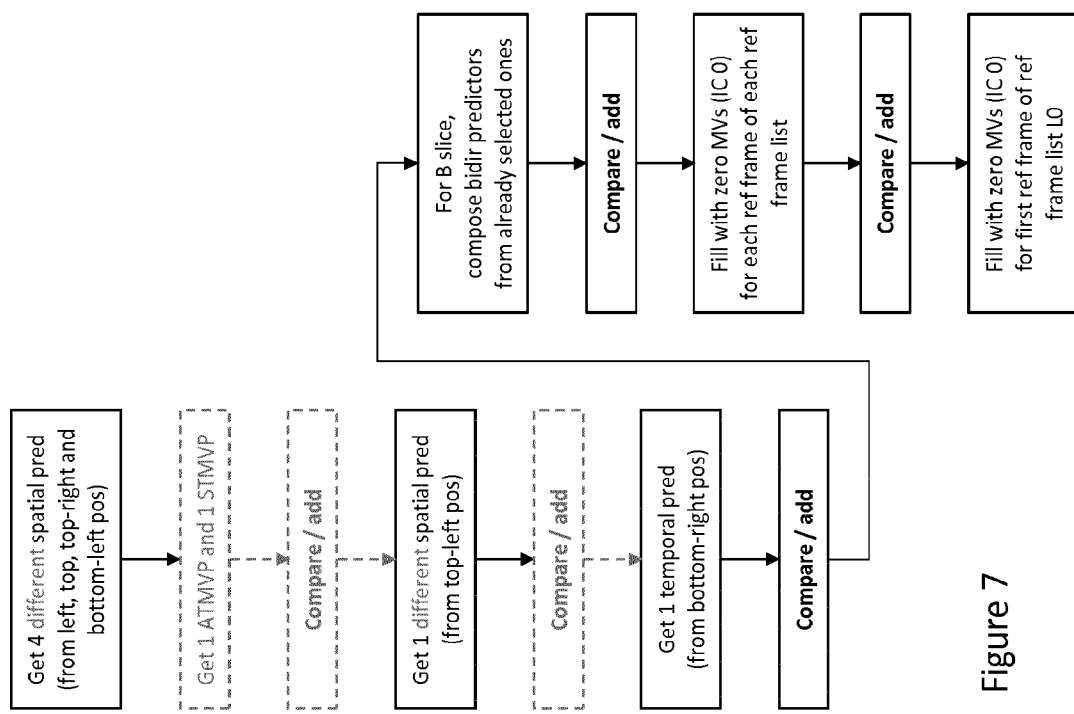
FIG. 7 shows a merge derivation process of seven unique predictors and their associated reference frame in a reference frame list, and IC flag.

FIG. 7 describes this embodiment compared to FIG. 2. On this diagram, the "compare/add" function consists in (i) comparing the just retrieved predictor to the already selected ones and (ii) adding it if not already present.

As a Merge predictor is composed of a motion vector, a reference frame index in a reference frame list and an IC flag, the comparison involves testing these four components.

In a third embodiment, the diversity of the FRUC candidates coming from the Merge ones can be improved (i) by using the same improvements as for Merge, i.e. as presented in FIG. 7, and (ii) by removing the IC flag from the Merge process of FIG. 7.

FRUC should use the process from the second embodiment, shown in FIG. 7, to inherit the candidate diversity from the Merge improvements.

To remove the IC flag, the comparisons performed in "compare/add" function and "different" function for spatial candidates should only focus on the three characteristics of the FRUC predictors (motion vector, reference frame index in a reference frame list) instead of the four ones of the Merge predictors. For that purpose, these functions must be informed of the mode used (Merge or FRUC).

In a fourth embodiment, the diversity of the Affine AMVP predictors can also be improved by ensuring a list of unique predictors.

Figure 8:
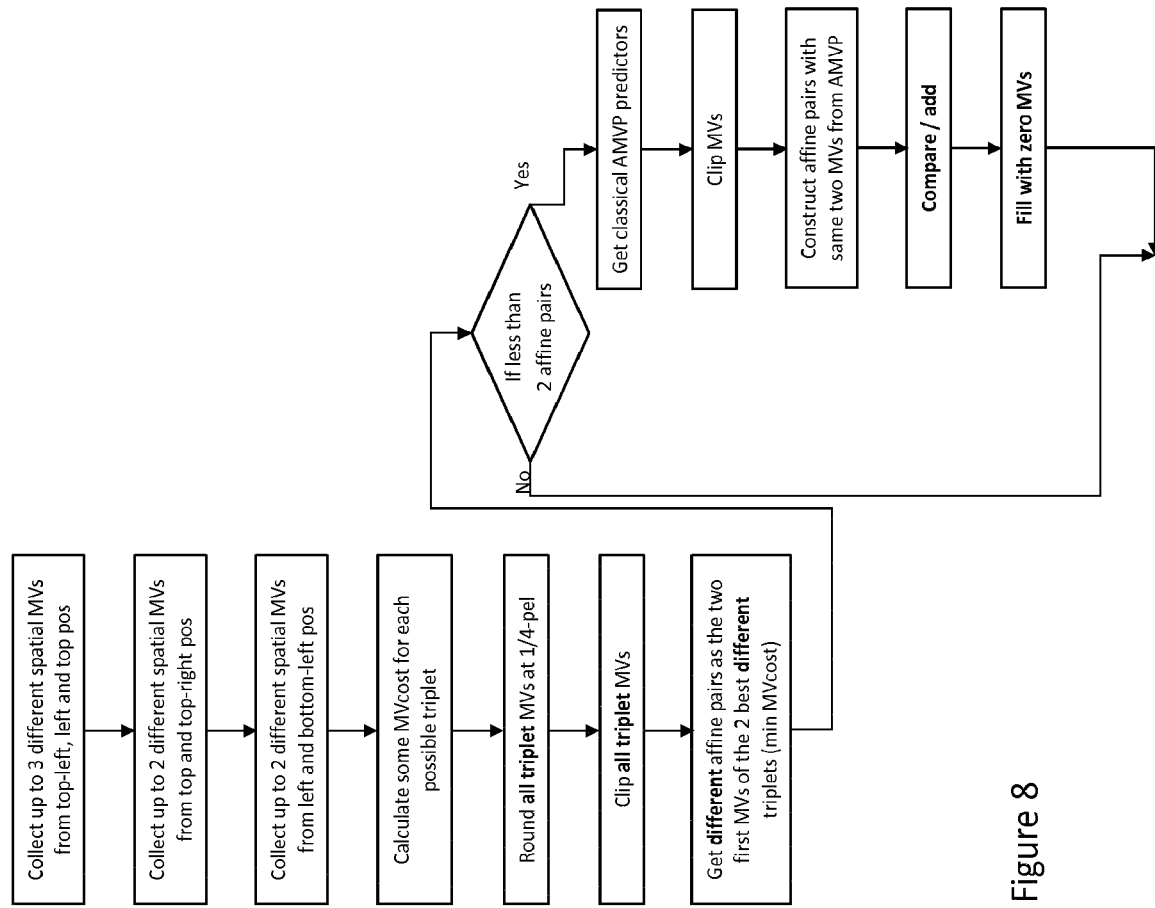
FIG. 8 shows an affine AMVP derivation process of two unique affine pairs of motion vector predictors for a particular reference frame of a particular reference frame list.
Figure 9:
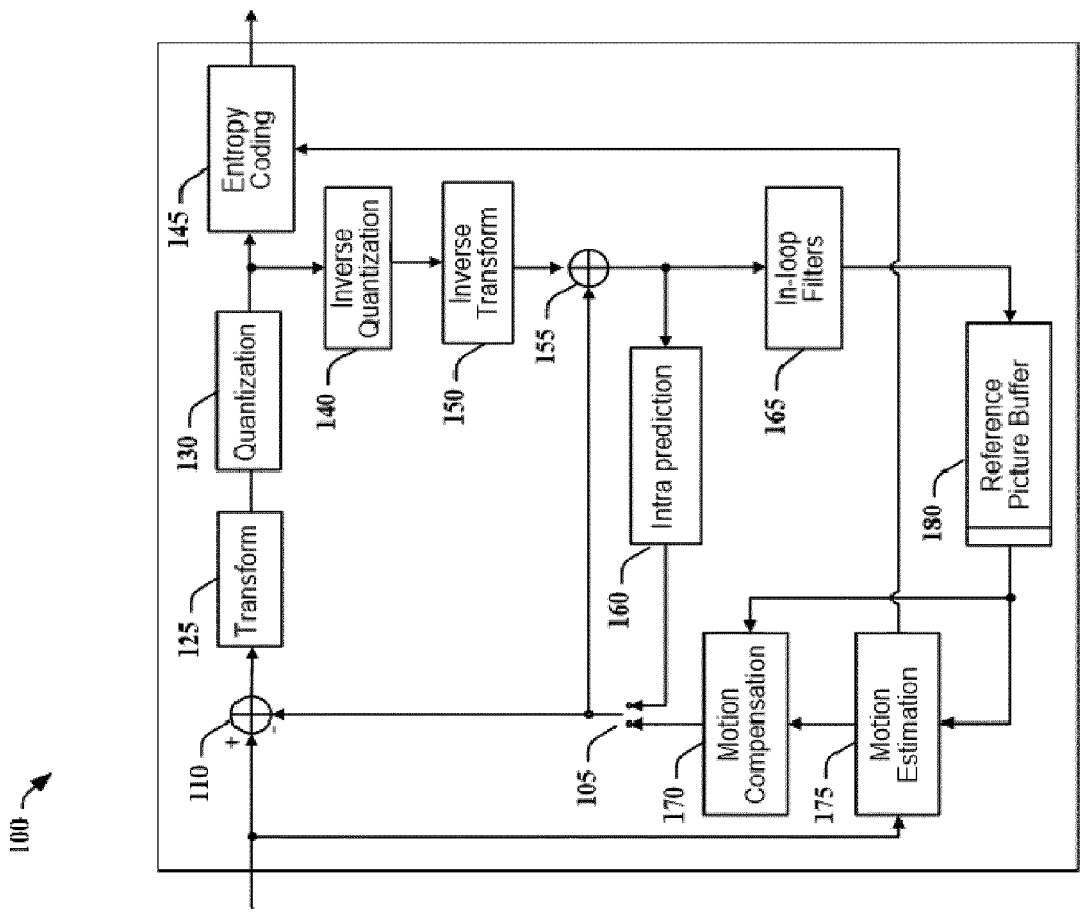
FIG. 9 shows a typical encoder to which the described embodiments can be applied.
Figure 10:
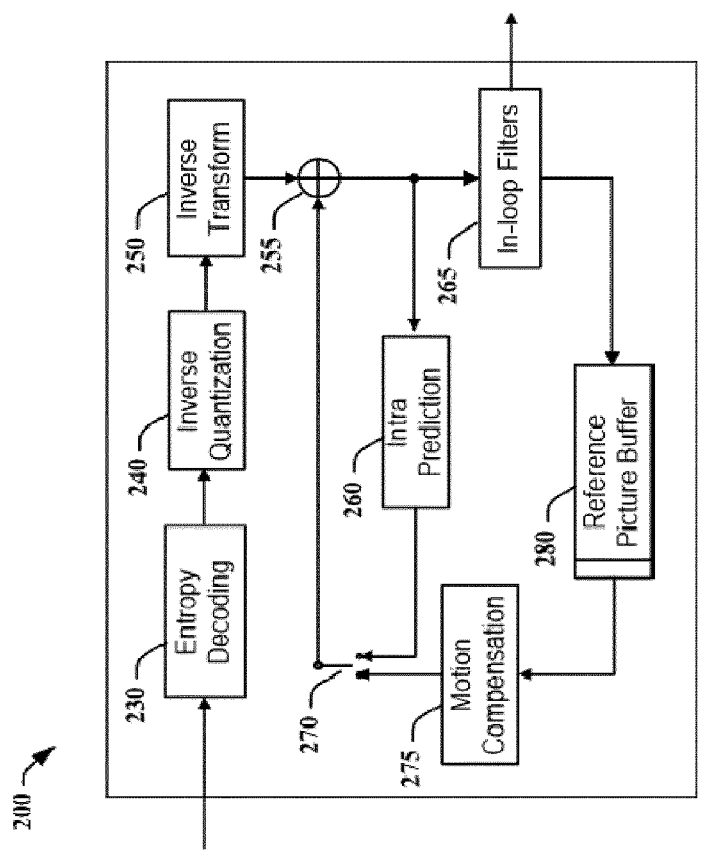
FIG. 10 shows a typical decoder to which the described embodiments can be applied.

For that purpose, all the operations that can modify the predictors are performed before selecting the affine pairs to ensure a full diversity. FIG. 8 shows this process where all triplets of motion vector predictors are rounded and clipped before selecting the two best ones. The two best triplets can be the first two different ones with the lower costs, for example, although other criteria can be used for selecting which ones should be added as candidates.

If not enough affine predictors have been found, the added AMVP candidates should also be treated with a "compare/add" function that manages comparing the candidate affine pair to a previously selected one before adding it, if not already present. As some affine pairs candidates could have been removed because, for example, they are equal to already selected ones, the affine AMVP list can be not full, that is, not filled with two unique affine pairs of motion vectors. It can be useful to fill this list with a pair of zero motion vectors.

In a fifth embodiment, the number of the Intra predictors can be reduced by removing the redundant ones.

Some reference samples used for directional predictions can be equal because either they are the same in the prediction frame or they are not available and filled with the first available neighbor.

In that case, several directions may produce the same prediction which can easily be inferred. It is then possible to keep only one of those directions in the test set. of candidates.

For example, on the left border of a frame, all left reference samples are filled with the first top sample. Horizontal prediction gives the same prediction as all bottom-left predictions which can be removed from the tested set of candidates. An example is mode 8 for AVC, modes 2 to 9 for HEVC, and modes 2 to 18 for JEM (Joint Exploration Test Model).

In a sixth embodiment, several of the previous embodiments can be coupled together. For AVC and HEVC, only the first two sub-embodiments of the first embodiment, the second embodiment and the fifth embodiment can be applied. And, for the JEM, all embodiments can be used. In both cases, any combination of usable embodiments can be observed.

Figure 5:
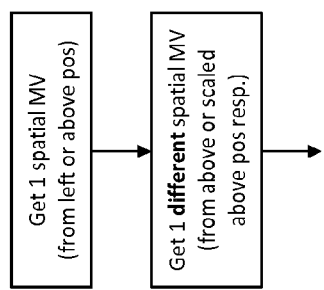
FIG. 5 shows two first steps of an AMVP derivation process of two unique motion vector predictors for a particular reference frame of a particular reference frame list.

In another embodiment, several embodiments are coupled in the JEM as:

For AMVP: the first two sub-embodiments of the first embodiment as described by FIG. 4 and FIG. 5 respectively.

For Merge: the second embodiment, described by FIG. 7.

For FRUC Merge candidate: the third embodiment, as described by FIG. 7 associated with an informed "compare/add" function removing IC flag test.

For affine AMVP: the fourth embodiment, as described by FIG. 8.

The described embodiments can be applied both at an encoder and a decoder. At encoding, all candidates are collected and compared in some RDO loops to isolate the best one. At decoding, candidates are collected in the same way until all possibilities are exhausted or until the searched one, the best encoded one, is found. For example, In AMVP, candidates are collected for each reference frame at encoding. Then at decoding, the reference frame is known (transmitted) and candidates are collected for this particular reference frame in exactly the same way as at encoding.

In Merge, seven candidates are collected at encoding, and the index of the best one is sent. Then at decoding, candidates are collected in the same way until the index of the searched one is reached.

So, the processes to collect such candidates are identical both at an encoding and a decoding side. To speed-up the decoder, a decoder can stop these processes as soon as the desired candidate is reached.

Figure 11:
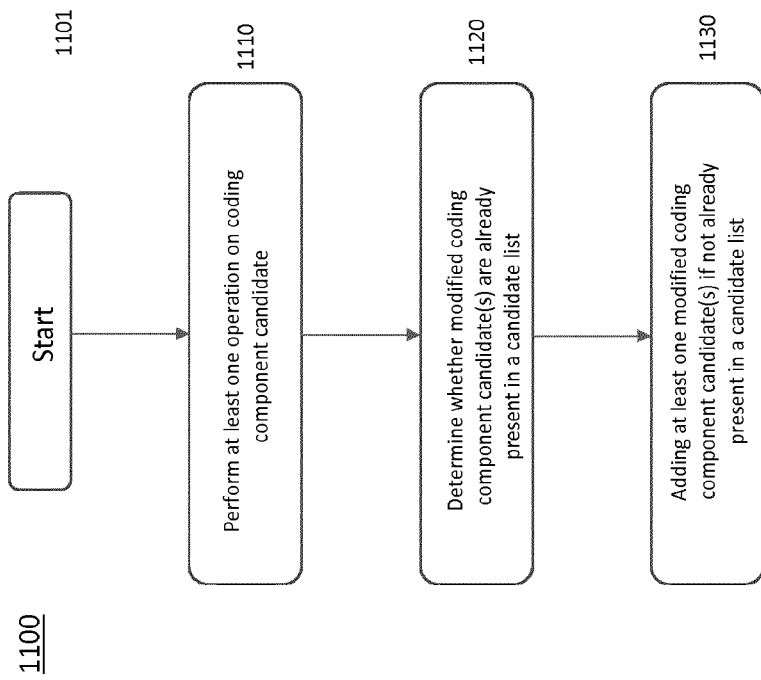
FIG. 11 shows one embodiment of a method used for encoding or decoding a video signal using candidate list pruning.

FIG. 11 shows one embodiment of a method 1100 for encoding or decoding a block of video data using candidate list pruning. The method commences at Start block 1101 and proceeds to block 1110 for performing at least one operation on a coding component candidate to generate modified coding component candidate(s). Control then proceeds from block 1110 to block 1120 for determining whether the modified coding component candidate(s) are already present in a candidate list. Control then proceeds from block 1120 to block 1130 for adding the at least one modified candidate if it is not previously present in the candidate list.

Figure 12:
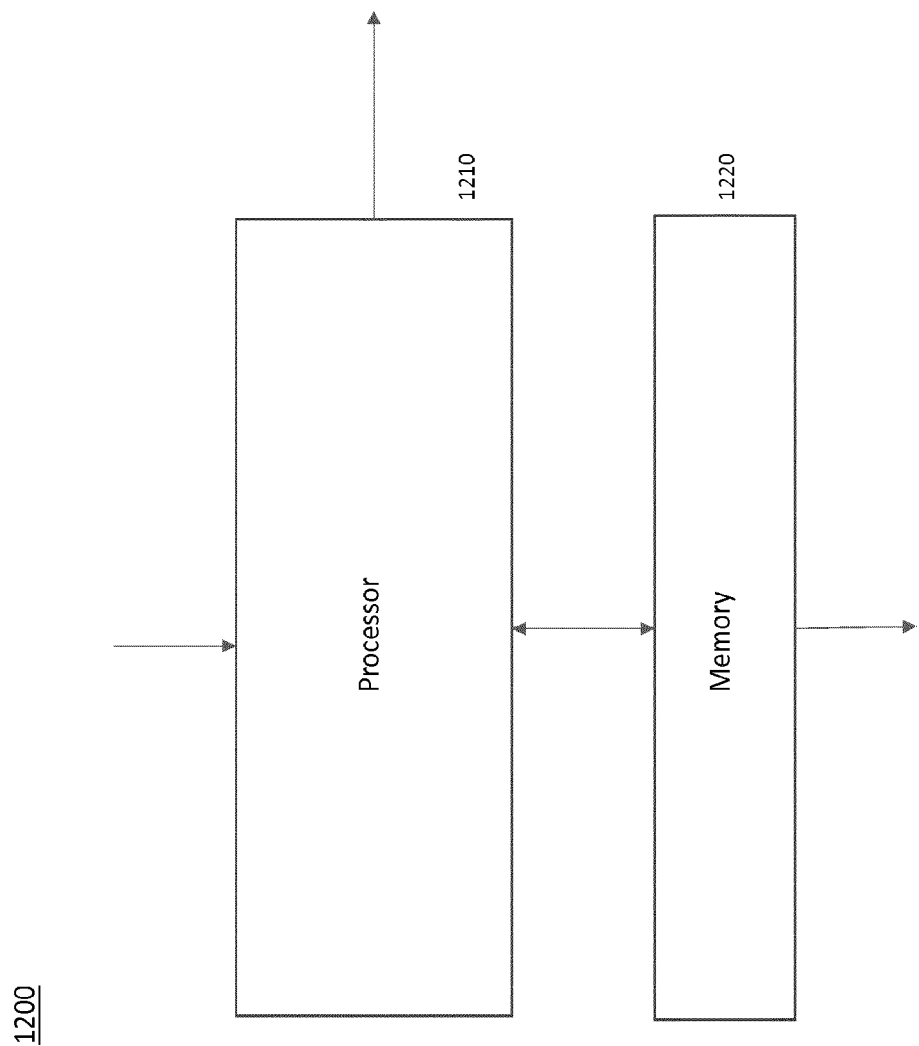
FIG. 12 shows one embodiment of an apparatus used for encoding or decoding a video signal using candidate list pruning.

FIG. 12 shows one embodiment of an apparatus 1200 for coding or decoding a block of video data. The apparatus comprises Processor 1210 which has input and output ports and is in signal connectivity with Memory 1220, also having input and output ports. The apparatus can execute any of the aforementioned method embodiments, or variations for encoding or decoding video signal data using candidate list pruning.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

In conclusion, candidate list pruning for video coding and decoding is provided by at least the described embodiments. The aim is to find the best candidate in the RDO sense among various candidates during video encoding and decoding.

By ensuring the uniqueness of the candidates within these lists, it is possible to improve the performances of tools with limited size lists, by adding diversity within these lists, and/or reduce the complexity of tools with unlimited lists, for example, by removing identical candidates within these lists.

The invention claimed is:

1. A method, comprising:
encoding a video signal using a candidate list by:
performing at least one of a plurality of rounding operations on an affine prediction candidate of a video signal, to generate at least one modified affine prediction candidate;
determining that said at least one modified affine prediction candidate is not currently in the candidate list; and
adding said at least one modified affine prediction candidate based on said determining that said at least one modified affine prediction candidate is not in the candidate list, and when said candidate list is not full, added AMVP candidates are compared to affine candidates and are added to the candidate list if not already present, and if said candidate list is not filled, filling the unfilled portion of the candidate list with a pair of zero motion vectors.

2. An apparatus, comprising:
a memory, and
a processor configured to encode a video signal using a candidate list by:
performing at least one of a plurality of rounding operations on an affine prediction candidate of a video signal, to generate at least one modified affine prediction candidate;
determining that said at least one modified affine prediction candidate is not currently in the candidate list; and
adding said at least one modified affine prediction candidate based on said determining that said at least one modified affine prediction candidate is not in the candidate list, and when said candidate list is not full, added AMVP candidates are compared to affine candidates and are added to the candidate list if not already present, and if said candidate list is not filled, filling the unfilled portion of the candidate list with a pair of zero motion vectors.

3. A method, comprising:
decoding a video signal using a candidate list, comprising:
performing at least one of a plurality of rounding operations on an affine prediction candidate of a video signal, to generate at least one modified affine prediction candidate;
determining that said at least one modified affine prediction candidate is not currently in the candidate list; and
adding said at least one modified affine prediction candidate based on said determining that said at least one modified affine prediction candidate is not in the candidate list, and when said candidate list is not full, added AMVP candidates are compared to affine candidates and are added to the candidate list if not already present, and if said candidate list is not filled, filling the unfilled portion of the candidate list with a pair of zero motion vectors.

4. An apparatus, comprising:

a memory, and a processor configured to decode a video signal using a candidate list by:

performing at least one of a plurality of rounding operations on an affine prediction candidate of a video signal, to generate at least one modified affine prediction candidate;

determining that said at least one modified affine prediction candidate is not currently in the candidate list; and adding said at least one modified affine prediction candidate based on said determining that said at least one modified affine prediction candidate is not in the candidate list, and when said candidate list is not full, added AMVP candidates are compared to affine candidates and are added to the candidate list if not already present, and if said candidate list is not filled, filling the unfilled portion of the candidate list with a pair of zero motion vectors.

5. The method of claim 1, wherein said intra prediction candidate comprises at least one of motion vector, or reference sample.

6. The method of claim 1, wherein said at least one rounding operation comprises rounding motion vectors to one-quarter pixel resolution and integer motion vector rounding of both predictors in an Advanced Motion Vector Prediction process.

7. The method of claim 6, wherein a second motion vector is obtained in an area not considered as a candidate for a first motion vector.

8. The method of claim 1, wherein an intra prediction candidate comprises a motion vector, a reference frame index, a reference frame list and an IC flag, are the candidates to be added to said candidate list if not previously present in said candidate list.

9. The method of claim 1, wherein candidates in a frame rate up conversion process are found, comprising a motion vector, a reference frame index, and a reference frame list.

10. A non-transitory computer readable medium storing instructions that, when executed by a computer cause the computer to perform the method of claim 3, for playback.

11. A computer program product comprising instructions which, when the program is executed by a computer, cause the computer to carry out the method of claim 1.

12. The apparatus of claim 2, wherein said at least one operation comprises clipping, rounding, and selecting a different candidate.

13. The apparatus of claim 4, wherein said at least one operation comprises clipping, rounding, and selecting a different candidate.

14. The method of claim 1, wherein a first operation is rounding, and the second operation is clipping.

15. The method of claim 3, wherein a first operation is rounding, and the second operation is clipping.

16. The method of claim 3, wherein a merge predictor comprising a motion vector, a reference frame index, a reference frame list and an IC flag, are the candidates to be added to said candidate list if not previously present in said candidate list.

17. The method of claim 3, wherein candidates in a frame rate up conversion process are found, comprising a motion vector, a reference frame index, and a reference frame list.

18. The apparatus of claim 4, wherein a merge predictor comprising a motion vector, a reference frame index, a reference frame list and an IC flag, are the candidates to be added to said candidate list if not previously present in said candidate list.

19. The apparatus of claim 4, wherein candidates in a frame rate up conversion process are found, comprising a motion vector, a reference frame index, and a reference frame list.

* * * * *